US011865555B2

(12) United States Patent
Foubert et al.

(10) Patent No.: US 11,865,555 B2
(45) Date of Patent: Jan. 9, 2024

(54) LOW DRIFT FLAT FAN SPRAY NOZZLE

(71) Applicant: SOLCERA, Evreux (FR)

(72) Inventors: Hervé Foubert, Evreux (FR); Alexandre Billoir, Evreux (FR); Paul Tourneroche, Evreux (FR)

(73) Assignee: SOLCERA, Evreux (FR)

( * ) Notice: Subject to any disclaimer, the term of this patent is extended or adjusted under 35 U.S.C. 154(b) by 28 days.

(21) Appl. No.: 17/183,949

(22) Filed: Feb. 24, 2021

(65) Prior Publication Data

US 2021/0268522 A1 Sep. 2, 2021

(51) Int. Cl.
*B05B 1/04* (2006.01)

(52) U.S. Cl.
CPC .................................... *B05B 1/044* (2013.01)

(58) Field of Classification Search
CPC ........................ B05B 1/042–046; B05B 1/267
See application file for complete search history.

(56) References Cited

U.S. PATENT DOCUMENTS 4,128,206 A * 12/1978 Bintner ................... B05B 1/042 239/599
5,133,502 A * 7/1992 Bendig ................... B05B 1/042 239/524
5,615,836 A * 4/1997 Graef .................... B05B 7/0425 239/432
7,243,861 B2 * 7/2007 Foubert ................. B05B 1/3421 239/487
7,552,881 B2 * 6/2009 Lipthal ................... B05B 1/048 239/524
9,630,189 B2 * 4/2017 Swan ................... A01C 23/047
10,201,794 B2 * 2/2019 Lacroix .................. C10G 11/18
10,406,540 B2 * 9/2019 Jackson ............... F02M 61/145
2005/0224602 A1 * 10/2005 Foubert ................. B05B 1/3421 239/463
2008/0290197 A1 * 11/2008 Fecht .................. B21B 45/0233 239/592
2015/0321206 A1 * 11/2015 Swan .................. A01C 23/047 239/8
2021/0069733 A1 * 3/2021 Schmidt .................... B05B 1/06
2021/0268522 A1 * 9/2021 Foubert ................... B05B 1/044
2023/0265644 A1 * 8/2023 Halloran ................... E03D 9/00 4/420

FOREIGN PATENT DOCUMENTS

FR 2838069 A1 10/2003

* cited by examiner

*Primary Examiner* — Joseph A Greenlund
(74) *Attorney, Agent, or Firm* — Volpe Koenig

(57) ABSTRACT

The spray nozzle includes a body, which has a fluid inlet region and a fluid outlet orifice, and which houses:

a core, internally defining a passage, of increasing cross-section, in communication with the outside substantially at the point of its smallest cross-section, resulting in a Venturi effect, an insert, provided with an outlet slot defining the opening angle of the nozzle, the core and the insert being at a distance from one another and forming therebetween a working chamber.

The nozzle further includes a splitter, housed in the working chamber, arranged to form an obstacle to the flow of the fluid, the splitter having two axial orifices, each forming a fluid passage, on either side of a radial plane, such that the two streams passing through the orifices of the splitter combine and then impinge the surface of the outlet slot of the insert, ultimately generating a flat jet.

4 Claims, 13 Drawing Sheets

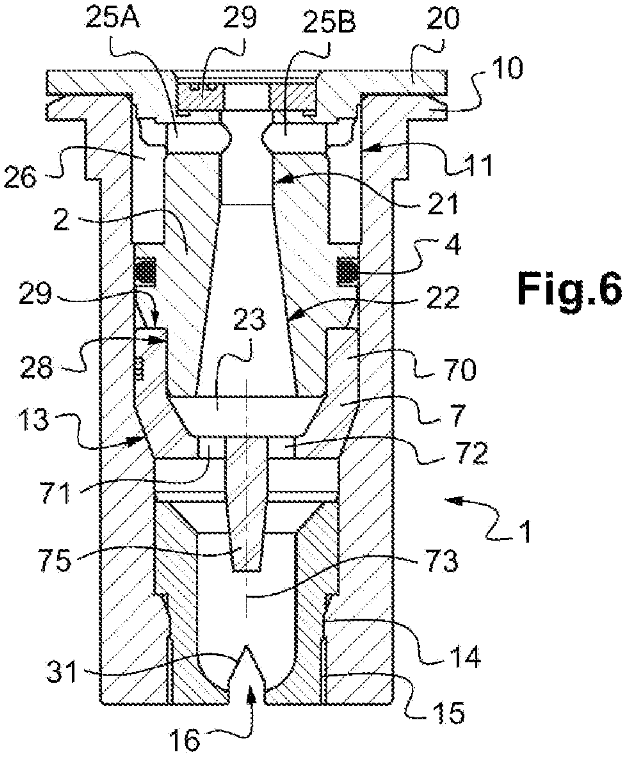
Fig.6
Fig.7
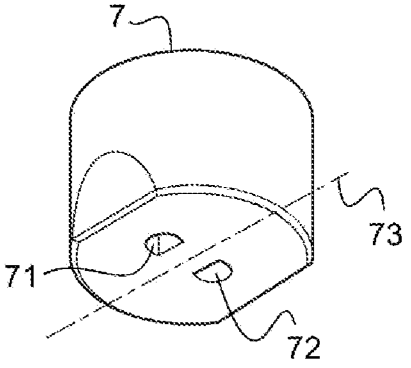

LOW DRIFT FLAT FAN SPRAY NOZZLE

FIELD OF THE INVENTION

The invention concerns a spray nozzle.

BACKGROUND

On the outside, a spray nozzle looks like a case having an inlet orifice and an outlet orifice. Inside, the nozzle body is arranged to allow the dispersion of a liquid in the form of droplets and to form a jet of droplets, or spray, at the outlet, which has a determined spatial distribution. More generally, a nozzle body is arranged to generate a dispersion of droplets at the outlet of an outlet orifice of the nozzle. Such nozzles are, for example, used in the field of agriculture in order to spray plant protection products on crops.

Different types of nozzles are distinguished according to the particular shape of their jet: nozzles referred to as straight-jet, flat-jet or conical-jet, which may be a hollow cone or even a solid cone.

The present invention relates to the flat-jet type spray nozzles.

The essential characteristics of the flat jet are its opening angle and the distribution law of the droplets within this opening angle, such that a uniform cumulative distribution of drops is obtained when the nozzles are combined on a boom and spaced apart.

In sprayers, a nozzle is most often placed every 50 cm. The characteristics of the nozzles are chosen in order to ensure a substantially uniform distribution of the product to be sprayed on the surface of the agricultural land concerned.

It is known to achieve this with known nozzles, but there remains a problem. This works well without wind. However, the wind can cause the spray region extend beyond the edges of the surface of the agricultural land concerned. Firstly, this represents a loss of efficiency. However, it is also potentially harmful in the case of spray products which are aggressive and/or dangerous for living beings. It must therefore be avoided.

The applicant has thought that a solution would be to increase the size of the sprayed droplets, in order to reduce their sensitivity to the wind. However, it is not a simple problem to obtain nozzles which have the same opening angle, with uniformity of the cumulative distribution of droplets within this angle, and to do this for larger droplets.

In general, a nozzle comprises a body forming a case and enclosing one or more members and/or elements arranged to disturb the jet, in other words to act on the stream of liquid and to modify its characteristics before it is ejected via the outlet orifice, depending on the desired spray and the desired shape of the outlet jet.

The patent US U.S. Pat. No. 5,133,502A, entitled "FLAT-JET NOZZLE TO ATOMIZE LIQUIDS INTO COMPARATIVELY COARSE DROPS" constitutes a proposal in this direction. However, it only obtains modest drop sizes (FIG. 6 of said document), which remain below 500 micrometers, even with a low input pressure dropping to 1 bar.

The applicant produces a range of nozzles, referred to as AVI nozzles, which also achieve median drop sizes of approximately 500 micrometers.

These are flat-jet nozzles, referred to as air injection nozzles, in other words using an autonomous suction of the nozzle making it possible to increase the size of the drops much more efficiently than US patent U.S. Pat. No. 5,133,502A, for higher pressures.

In an AVI nozzle, from the inlet to the outlet, the nozzle body can enclose firstly a "core", which is a part having a generally cylindrical shape, defining an inner passage with increasing internal cross-section. This passage is placed in communication with the outside air, substantially at the point of its smallest cross-section, resulting in a Venturi effect. The central outlet orifice of this core leads to a working chamber, which will ensure the transition with the outlet orifice of the nozzle. In order to be able to produce a flat jet, an insert should be provided with an outlet slot. This slot forms the outlet orifice of the nozzle, for which it also defines the opening angle.

However, this nozzle also provides drop sizes limited to 500 micrometers, without making it possible to attain super-large drops, which would typically have an average size of 800 micrometers, over an interval extending from 400 micrometers to 1.2 mm.

In other words, the nozzle described as a direct-impingement nozzle, has a limitation which depends on the contact area of the liquid with the Venturi wall and thus the final length of the nozzle. It produces drops in the range 500-600 μm depending on the type of impingement injector. The objective is to overcome this limitation while retaining the nozzle size.

The invention improves the performance of such a nozzle.

SUMMARY

In general, the spray nozzle proposed is of the type comprising a body, which has a fluid inlet region and a fluid outlet orifice, the body housing a core, internally defining a passage, of increasing cross-section, in communication with the outside substantially at the point of its smallest cross-section, resulting in a Venturi effect, said smallest cross-section starting close to the fluid inlet region, an insert, provided with an outlet slot forming the outlet orifice (16) of the nozzle and defining the opening angle thereof, the core and the insert being at a distance from one another and forming between them a working chamber in the body.

It is characterized in that the nozzle further comprises an additional part called a splitter, housed in the working chamber, arranged to form an obstacle to the flow of the fluid, this splitter comprising two axial through-orifices, each forming a fluid passage, on either side of a radial plane, such that the two streams passing through the orifices of the splitter combine and then impinge the surface of the outlet slot of the insert, ultimately generating a flat jet.

From another point of view, the proposed spray nozzle is of the type comprising a body forming a case, which has an inlet orifice and an outlet orifice and which has a fluid inlet region on the inlet orifice side. From the inlet to the outlet, the nozzle body can enclose firstly a "Venturi core", which is a part having a generally cylindrical shape, defining an inner passage with increasing internal cross-section. This passage is placed in communication with the outside air, substantially at the point of its smallest cross-section, resulting in the Venturi effect. The central outlet orifice of this core leads to a working chamber, which will ensure the transition with the outlet orifice of the nozzle. In order to be able to produce a flat jet, an insert should be provided with an outlet slot. This slot forms the outlet orifice of the nozzle, for which it also defines the opening angle.

The proposed nozzle is characterized in that it comprises, in the working chamber and upstream of the insert, an additional part referred to hereinafter as the splitter. This part forms an obstacle to the flow of the liquid stream. It comprises two passages or longitudinal through-orifices, on either side of a central plane. The two streams which are passed through the orifices of the splitter recombine at the outlet of the splitter. They then impinge the surface of the outlet slot of the insert, in order to ultimately generate a flat jet.

A blade is preferably provided at the outlet of the splitter, in the central plane. Leaving the splitter, the two streams will flow along this blade and follow the surface by the "teapot effect" (sometimes incorrectly termed the Coanda effect), before recombining in order to impinge the surface of the outlet slot of the insert.

The blade of the splitter is adjusted or "indexed" on the slot of the insert. In other words, the plane of the blade substantially coincides with the plane of the outlet slot of the insert.

BRIEF DESCRIPTION OF THE DRAWINGS

Further features and advantages of the invention will emerge from examining the following detailed description and the appended figures, in which:

FIG. 6 is an assembled view of the nozzle of FIG. 4, in section along a plane perpendicular to the plane of the outlet slot;

and and

Figure 8:
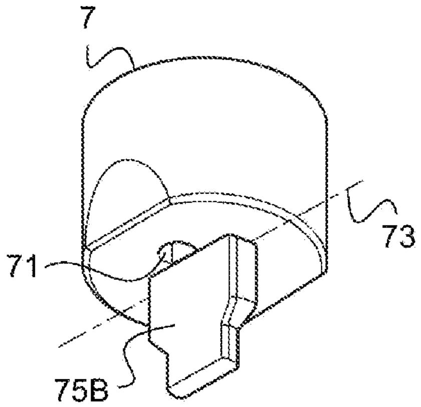
Figure 9:
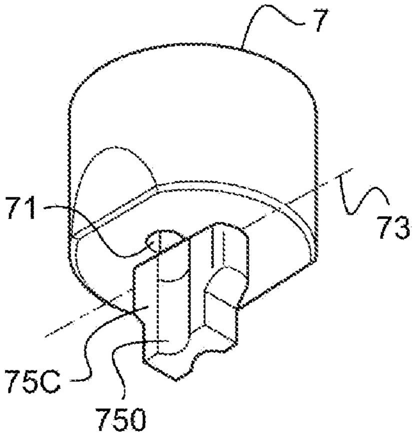
Figure 10:
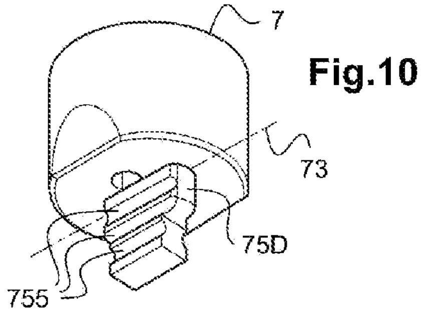
Figure 11:
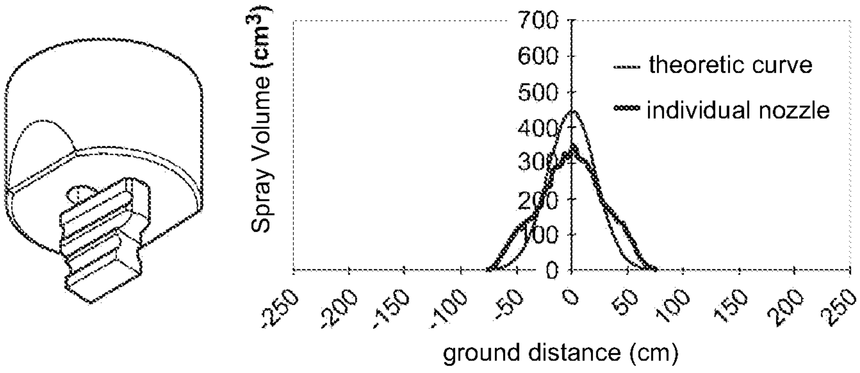
Figure 12:
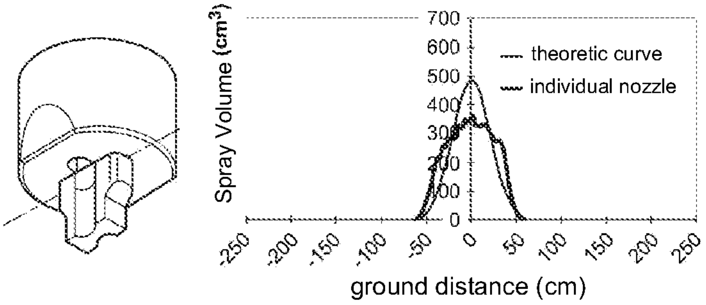
Figure 13:
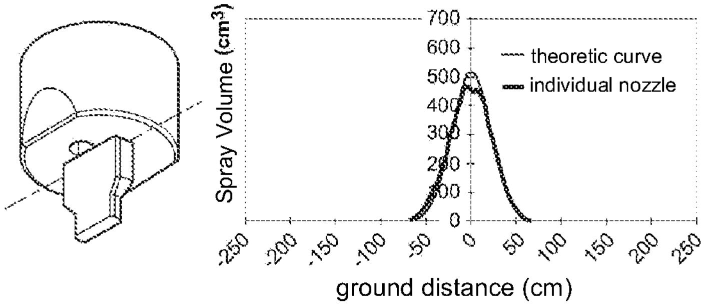
Figure 14:
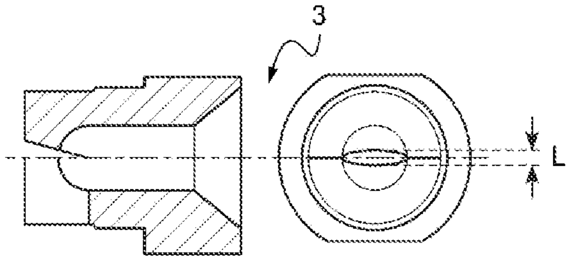

FIG. 7 shows a perspective view of a first embodiment of the added part called a splitter;

FIG. 8 shows a perspective view of a second embodiment of the added part called a splitter;

FIG. 9 shows a perspective view of a third embodiment of the added part called a splitter;

FIG. 10 shows a perspective view of a fourth embodiment of the added part called a splitter;

FIG. 11 is a graph illustrating the performance of the nozzle with the splitter of FIG. 10;

FIG. 12 is a graph illustrating the performance of the nozzle with the spark gap of FIG. 9;

FIG. 13 is a graph illustrating the performance of the nozzle with the spark gap of FIG. 8;

FIG. 14 is an enlarged view of the output slot of the nozzle.

DETAILED DESCRIPTION OF THE PREFERRED EMBODIMENTS

The drawings and the description below contain, for the most part, elements of a certain nature, which it is difficult to describe other than through the drawing. Consequently, the drawings form an integral part of the description and can therefore not only serve as a means to better understand the present invention, but also contribute to its definition where appropriate.

Figure 1:
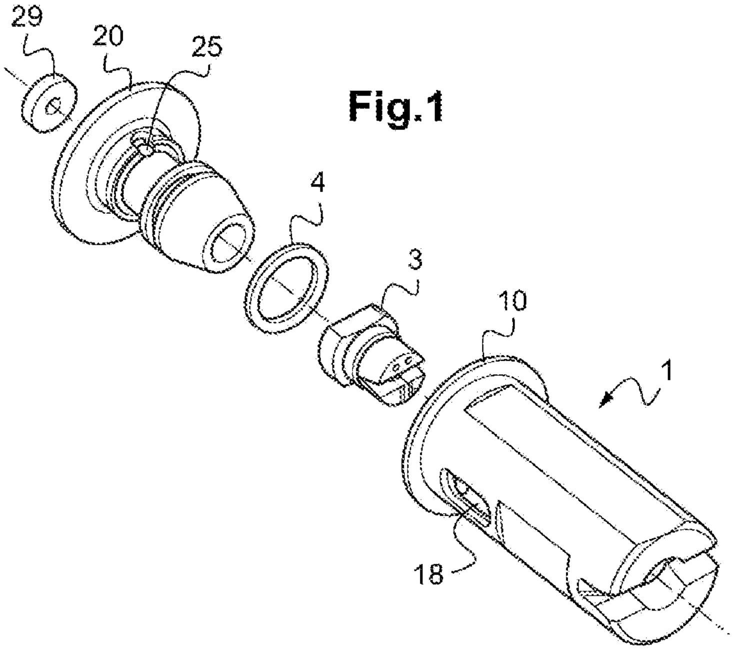
FIG. 1 is an exploded front perspective view of a known flat-jet spray nozzle.
Figure 2:
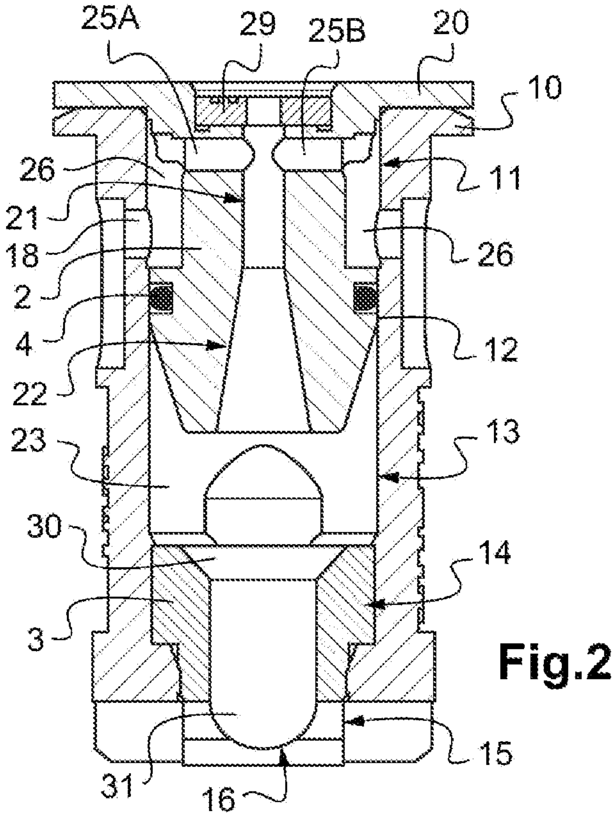
FIG. 2 is an assembled view of the nozzle of FIG. 1, in section along a plane which passes through the outlet slot.
Figure 3:
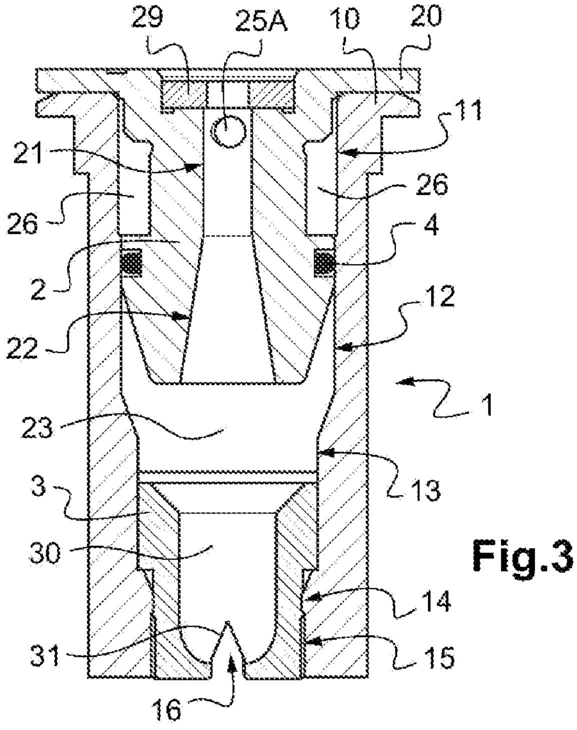
FIG. 3 is an assembled view of the nozzle of FIG. 1, in section along a plane perpendicular to the plane of the outlet slot.

FIGS. 1 to 3 show a known flat-jet spray nozzle, such as the applicant's nozzle AVI-110-04.

The nozzle comprises a body 1 which defines, inside, a hollow case of a generally cylindrical shape, comprising:

a first bore 11, provided with a flange 10 on the inlet side, and followed by a second bore 12 that is slightly narrower;

a third bore 13, followed by a fourth bore 14 that is slightly narrower; and finally, an outlet bore 15.

Note that the word "bore" refers here to a female element of a circular fitting, whatever its method of machining. Indeed, the parts not being metallic, but rather made of synthetic material or ceramic, they are not machined by the conventional boring for metals.

A Venturi core 2 is inserted in the bores 11 and 12, which starts with a cover 20, pressing on the flange 10. Internally, the Venturi core 2 has a first straight cylindrical volume 21, followed by a conical volume 22. This defines an inner passage with increasing internal cross-section.

The volume 21 is crossed by radial passages 25A and 25B, which communicate via an annular recess 26 with external air inlets 18 provided through the wall of the body 1.

Finally, the top of the core is equipped with a flow rate calibration element 29, which in this case is a pellet with a calibration orifice.

A Venturi effect occurs in the core 2 due to the channel formed by the calibration pellet 29 and the volumes 21 and 22. The intensity of the Venturi effect depends on the pressure of the liquid at the input. A liquid+air mixture is produced in the cavity 23 located downstream of the Venturi core, as a consequence of the Venturi effect.

An O-ring 4 is provided in an external peripheral groove of the core 2, which ensures the seal between the annular recess 26 and the downstream side of the core 2.

Lower down, the body 1 contains a spray insert 3, which comprises a cylindrical cavity 30 leading to a slot 31, which is in the plane of FIG. 2 and perpendicular to the plane of FIG. 3. This slot 31 constitutes the outlet orifice of the nozzle.

The insert 3 is put in place and held by screwing and has, for this purpose, an externally threaded portion located close to its end 16 and arranged to interact with a corresponding tapping (not visible) of the bore 15 of the body 1. In another embodiment, the insert 3 is assembled to the body 1 by crimping. For this purpose, the insert 3 is positioned in the body 1 then squeezed using a press.

The Venturi effect makes it possible, in particular, to obtain drops which are slightly larger, due to the creation of the air/liquid mixture, but without doing much better than 500 micrometers.

The proposed nozzle will now be described with reference to FIGS. 4 to 6.

This nozzle has the same general structure as that of FIGS. 1 to 3.

Figure 4:
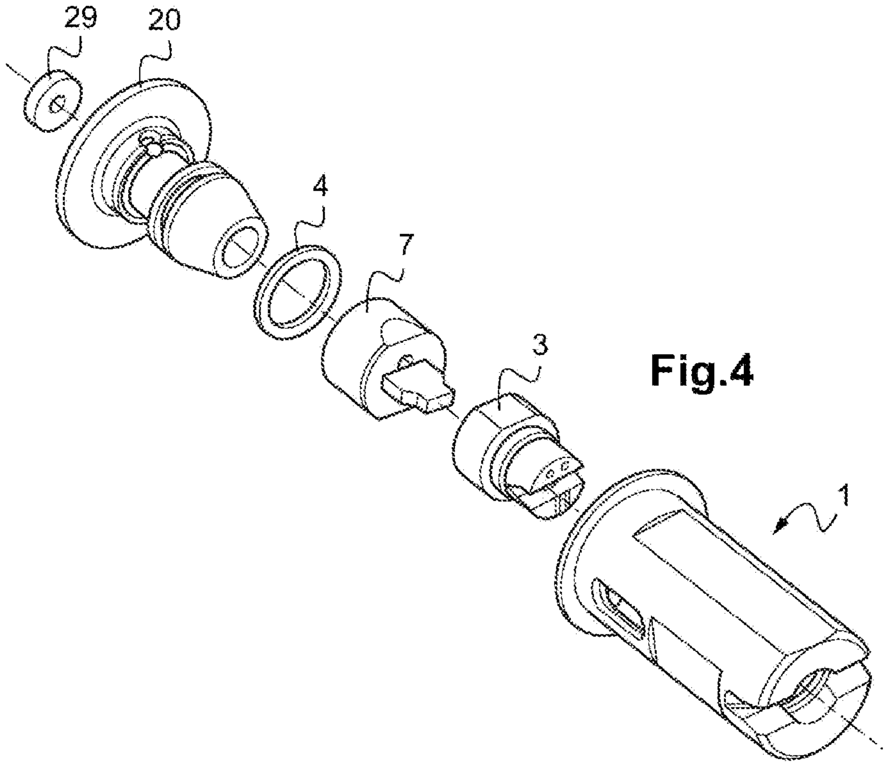
FIG. 4 is an exploded front perspective view of the flat-jet spray nozzle proposed herein.
Figure 5:
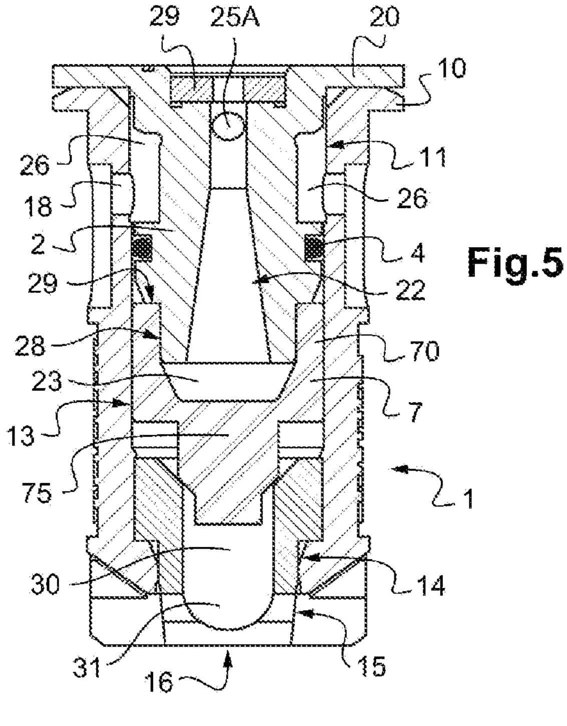
FIG. 5 is an assembled view of the nozzle of FIG. 4, in section along a plane which passes through the outlet slot.

The items common to FIGS. 1 to 3 on the one hand and FIGS. 4 to 6 on the other hand will therefore not be described again.

In FIGS. 4 to 6, the inner space 23 located upstream of the insert is occupied by an additional part 7, herein called a splitter.

On the upstream side, the splitter comprises a peripheral cylindrical dome 70, which engages in a recess 28 formed in the downstream outer periphery of the core 2, and abuts on a shoulder 29 of this core 2. In its radial portion, the dome

70 comprises two longitudinal through-passages or orifices, 71 and 72, provided symmetrically on either side of a central radial plane 73.

The splitter is preferably followed by a blade 75 which is also placed symmetrically with respect to the radially central plane 73.

On leaving the splitter, the two streams which have passed through the orifices 71 and 72 will flow along the blade 75 and follow its surface by the "teapot effect" in order to recombine. The two streams thus combined impinge the outlet surface of the insert 3 and create a "flat fan" type of flat jet.

The circulation of the fluid through the nozzle 1 is as follows.

A supply of liquid to be sprayed is connected to the nozzle 1. The stream enters via the orifice of the ceramic calibration pellet 29 of circular cross-section then, directed by the pressure, it moves into the duct of the core 2 that has restricted cross-section and then widens. The presence of air intakes (25A, 25B, 26, 18) at the point where the core cross-section is most restricted, combined with the low pressure of the stream at this location (due to its acceleration), enables external air to be drawn in by the Venturi effect and its mixture with the stream.

At the inlet into the splitter, the mixture thus obtained comes into contact with the surface between the two orifices of the splitter. The impingement will cause a strong drop in the flow energy, which will be directed by pressure to the two outlet orifices, 71 and 72, of the splitter. On leaving the splitter, the two streams will flow along the blade 75 and follow the surface by the "teapot effect" in order to recombine. The two streams thus combined will impinge the outlet surface 31 of the insert 3 and create a "flat fan" type of flat jet with controlled angle and dispersion.

FIGS. 7 to 10 show four embodiments of the splitter 7 tested by the applicant.

In FIG. 7, the splitter does not have a blade.

In FIG. 8, the splitter has a substantially flat blade 75B, as illustrated in FIGS. 4 to 6.

In FIG. 9, the splitter also has a flat blade 75C, but provided with channels with cylindrical shape based on an arc of a circle, which extend the orifices 71 and 72.

In FIG. 10, the splitter again has a flat blade 75D, but this time provided with transverse ridges.

We now turn to one of the preferred applications of the invention, which is the spreading of products to be sprayed on the surface of agricultural land, for example concerned plant protection products.

These applications use spreading booms, typically provided with nozzles spaced apart by 50 cm, suspended approximately 50 cm (in practice from 40 to 60 cm) above the ground, or more particularly approximately 50 cm above crops. The known AVI nozzles, for example AVI-110-04, can be used for these applications. However, they produce droplets which, at the edge of the area to be sprayed, can be pushed by the wind, possibly disintegrate, and reach, for example, inhabited surfaces, which is harmful for their occupants, at least in the case of those plant protection products that are harmful to health. It is now desired to have nozzles classified as 90% drift reduction, with comparable flow rate and spraying angle.

FIGS. 11 to 13 show a theoretical curve that is Gaussian in appearance and which represents the desired volume distribution of spray by the nozzle, as a function of the horizontal distance to the axis thereof. The spacing of the dispersion on the ground is +1-50 cm. According to the theoretical curve, two nozzles spaced apart by 50 cm will produce a substantially uniform spray on the ground.

FIG. 14 illustrates, in enlarged view, the outlet slot of the nozzle, which has a width L.

The applicant has sought to improve the existing nozzle AVI-110-04 in order to have droplets that are less sensitive to the wind. The applicant has considered that the size of the droplets produced by an AVI-type nozzle is directly dependent on the geometric parameters of the insert, in particular on its slot width L. This slot width has been increased, going from L=0.9 mm to L=1.3 mm in the case of nozzle AVI-110-04, in order to increase the average diameter of the drops. More generally, the slot size is increased by 40 to 50%.

It was then observed that the nozzles thus obtained had significant priming difficulties due to too low a pressure of the liquid stream exiting the core.

The applicant therefore decided to position an intermediate part, called a "splitter", between the core and the insert (assembled on the core).

The nozzles thus obtained have proven to be functional; their priming occurs as soon as the nozzle is started up and splitting of the stream and formation of a flat-fan type of jet are obtained.

Several models of nozzles have been assembled with splitters (those of FIGS. 7 and 10) and subjected to drop size measurements.

All the nozzle models put forward have mean drop diameters of approximately 800 μm, i.e. an increase of approximately 50%. This result is considered to be fully satisfactory.

The proposed solution not only achieves distribution and size of very large droplets, but also ensures being able to work at pressures of 2 bar and above while obtaining the required level of drift reduction.

It thus appears that the geometry of the splitter has a major impact on the reforming of the jet at its outlet and therefore on the function of the nozzle and on its compliance with the standard (flow rate, angle, distribution of the fluid spread).

A multitude of splitters, examples of which are presented in FIGS. 7 to 10, have been tested by varying the splitting solutions and the geometries specific to each of these solutions. The nozzles are therefore characterized by angle, flow rate, visual observations and distribution on the ground of the spread fluid.

The results are given in FIGS. 11 to 13 for three types of splitter (those of FIGS. 8 to 10), the rest of the nozzle being the same.

FIG. 13 shows the best correspondence between the theoretical curve and the flow rate distribution of the nozzle.

However, the other distributions (FIGS. 11 and 12) are also promising and could be used in certain cases, in particular if deviating from the typical construction of spreading booms in particular the inter-nozzle spacing of 50 cm.

In a particular embodiment:

the nozzle body 1 is made of plastic material;

the insert 3 can be made of ceramic, or even of plastic material;

the splitter 7 is made of plastic material, but can also be made of ceramic;

the Venturi core 2 can be made of plastic material or of ceramic;

the pellet 1 is made of plastic material or of ceramic.

The plastic material is typically a polyoxymethylene or POM, which is a polymer from the family of polyacetals, for its ease of shaping and the associated mechanical properties, or any other equivalent plastic material that is chemically compatible with the fluid to be spread.

The ceramic can be alumina, likewise for its ease of shaping and its associated mechanical properties, or an equivalent material.

The dimensions of the splitter 7 are chosen with respect to the two main constraints. The first constraint is controlling the discharge coefficient induced by the splitter 7, compared with that induced by the insert 3, which involves controlling the overall surface area of the two orifices of the splitter. The second constraint is an optimal impingement of the two streams exiting the splitter 7 in the insert 3. This optimum impingement is obtained by:

the presence of the blade 75 which, by adhesion of the fluid against same, will limit the turbulence of jets at the outlet of the splitter on the one hand, and on the other hand will limit the turbulence at the outlet of the nozzle (outlet orifice); and a stream spacing and the dimensions of the blade. The fact that the outer diameter of the orifices is close to or tangential to the diameter of the insert can also play a role. The stream spacing, the width of the blade and its length are adjusted for each model so as to maximize the impingement energy of the two streams and to allow an optimum splitting (produced by the discharge insert) at low pressure.

The control of these elements makes it possible to produce a spray angle that is sufficient to optimize the overlap of the jets at lower pressure, below 3 bar, and this without the need for sizing the height of the outlet slot 31 of the insert 3 in a noticeable manner. In this way, a known problem from the prior art, which is the condition of needing to produce the two walls of the outlet slot in a parallel manner, is notably avoided. The effect of parallel walls is to reduce the visible area of rupture of the ligaments forming the drops.

The invention claimed is:

1. Spray nozzle of the type comprising a body (1), which has a fluid inlet region and a fluid outlet orifice, the body (1) housing:

a core (2), internally defining a passage, of increasing cross-section, in communication with the outside substantially at the point of the core's smallest cross-section, resulting in a Venturi effect, said smallest cross-section starting adjacent the fluid inlet region, an insert (3), provided with an outlet slot (31) forming the fluid outlet orifice (16) of the nozzle and defining the opening angle thereof, the core (2) and the insert (3) being at a distance from one another and forming between them a working chamber (23) in the body (1), wherein the nozzle further comprises an additional part (7) called a splitter, housed in the working chamber (23), arranged to form an obstacle to a flow of a fluid, said splitter comprising two axial through-orifices (71, 72), each forming a fluid passage, on either side of a radial plane (73), and, at the outlet, a substantially flat blade (75), in the central plane such that the two streams passing through the two axial through-orifices (71, 72) of the splitter, flow along the substantially flat blade and follow a surface thereof before combining and then impinging the surface of the outlet slot (31) of the insert, ultimately generating a flat jet.

2. The spray nozzle according to claim 1, wherein the blade (75C), is provided with channels (750) with cylindrical shape based on an arc of a circle, which extend the two axial through-orifices (71, 72).

3. The spray nozzle according to claim 1, wherein the blade (75D) is provided with transverse ridges (755).

4. The spray nozzle according to claim 1, wherein the blade (75) is indexed parallel to the slot (31) of the insert (3).

* * * * *